United States Patent
Schofield et al.

(10) Patent No.: US 9,353,820 B2
(45) Date of Patent: May 31, 2016

(54) ELASTOMERIC DAMPER WITH HEATER

(71) Applicant: BELL HELICOPTER TEXTRON INC., Fort Worth, TX (US)

(72) Inventors: Emily Schofield, Colleyville, TX (US); Dan Sottiaux, Flower Mound, TX (US); Frank B. Stamps, Colleyville, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 298 days.

(21) Appl. No.: 13/861,092

(22) Filed: Apr. 11, 2013

(65) Prior Publication Data

US 2014/0305755 A1    Oct. 16, 2014

(51) Int. Cl.
| | |
|---|---|
| *F16F 9/32* | (2006.01) |
| *F16F 9/19* | (2006.01) |
| *B64C 27/51* | (2006.01) |
| *F16F 15/124* | (2006.01) |
| *B64C 27/635* | (2006.01) |

(52) U.S. Cl.
CPC . *F16F 9/32* (2013.01); *B64C 27/51* (2013.01); *B64C 27/635* (2013.01); *F16F 9/19* (2013.01); *F16F 15/124* (2013.01); *F16F 2230/00* (2013.01)

(58) Field of Classification Search
CPC ........... F16D 57/04; F16D 57/06; F16D 9/42; G01L 3/20; B60G 17/002; F16F 1/36; F16F 1/3615; F16F 9/532; F16F 9/3292; F16F 13/06; B64C 27/35; B64C 27/51
USPC ......... 188/274, 268, 269, 276, 299.1, 322.21, 188/267.1, 266.1–266.2; 267/34, 64.15, 267/64.28; 60/396; 237/12.3 A, 12.3 B; 165/47, 154; 310/43, 64, 65; 416/106, 416/107, 140, 141, 144, 145
See application file for complete search history.

(56) References Cited

U.S. PATENT DOCUMENTS

| | | | | |
|---|---|---|---|---|
| 3,067,841 | A * | 12/1962 | Kendall | F16F 5/00 188/268 |
| 5,927,071 | A * | 7/1999 | Asanuma | B60G 17/002 165/154 |
| 5,957,440 | A * | 9/1999 | Jones | F16F 7/1005 244/54 |
| 6,170,621 | B1 * | 1/2001 | Nakahara | B60G 17/002 188/274 |
| 6,179,098 | B1 * | 1/2001 | Hayakawa | B60G 17/002 188/274 |
| 6,318,521 | B1 * | 11/2001 | Niaura | F16F 9/532 188/267.1 |
| 6,328,144 | B1 * | 12/2001 | Hayakawa | B60G 15/12 188/274 |

(Continued)

FOREIGN PATENT DOCUMENTS

| | | | | |
|---|---|---|---|---|
| GB | 2155143 | A * | 9/1985 | ........... B60G 17/002 |
| JP | S60193709 | | 10/1985 | |
| JP | 2001206033 | | 7/2001 | |

OTHER PUBLICATIONS

European Search Report dated Sep. 5, 2013 from counterpart EP App. No. 1316828.9.

(Continued)

*Primary Examiner* — Anna Momper
*Assistant Examiner* — San Aung
(74) *Attorney, Agent, or Firm* — James E. Walton

(57) ABSTRACT

A damper system includes a damper and a heater operably associated with the damper. The method includes heating the damper with heat energy from the heater and then monitoring and regulating the heat energy to the damper with a sensor and control subsystem.

5 Claims, 5 Drawing Sheets

(56) References Cited

U.S. PATENT DOCUMENTS

| | | | |
|---|---|---|---|
| 6,676,074 B2 * | 1/2004 | Zoppitelli | B64C 27/35 244/17.11 |
| 6,691,841 B2 * | 2/2004 | Otake | B60G 17/002 188/274 |
| 7,686,584 B2 | 3/2010 | Schmaling | |
| 8,113,321 B2 * | 2/2012 | McGuire | B64C 27/001 188/266.3 |
| 2002/0154940 A1 | 10/2002 | Certain | |
| 2008/0044283 A1 * | 2/2008 | Schmaling | B64C 27/51 416/134 A |
| 2011/0180684 A1 * | 7/2011 | West | F16F 1/379 248/557 |
| 2012/0141276 A1 | 6/2012 | Fuhrer et al. | |

OTHER PUBLICATIONS

European Search Report dated Oct. 31, 2014 from counterpart EP App. No. 1316828.9.

* cited by examiner

ELASTOMERIC DAMPER WITH HEATER

BACKGROUND

1. Field of the Invention

The present application relates generally to damper systems, and more specifically, to damper systems for aircraft.

2. Description of Related Art

Dampers are well known in the art for effectively dampening adverse forces exerted on a structure. Rotary aircraft utilize dampers to dampen forces, e.g., lead/lag forces, exerted on the components of the rotor system via the rotor blades during flight. The dampers are typically manufactured with one or more elastomeric materials that are configured to dampen the forces. In some embodiments, the dampers could utilizes a plurality of fluid chamber in communication with each other, wherein movement of the damper means disposed within the damper causes the fluid carried within the chambers to pass through a common passage, which in turn dampens the adverse forces.

It should be understood that rotary aircraft must undergo preflight preparations to "warm" the dampers prior to flight. Current methods to prepare the dampers for flight include operating the aircraft at non-flight conditions. The process exhausts considerable time, resulting in significant costs.

Another problem associated with conventional dampers is the inability to change the spring rate of the damper in real time. For example, the aircraft operates at various flight conditions, which affects the damper's performance. In some cases, it is possible to fly outside the designed damper spring rate, thus greatly reducing the efficiency of the damper.

Although the foregoing developments in dampers represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
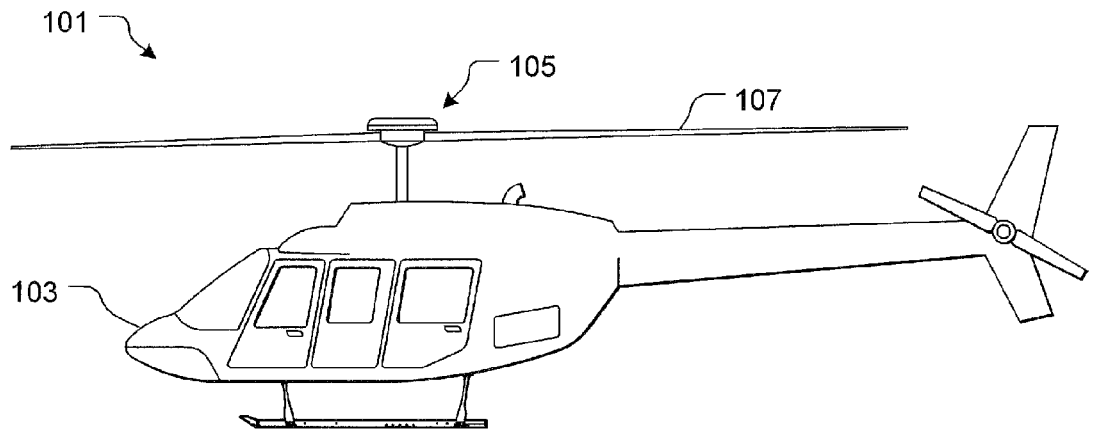
FIG. 1 is a side view of a helicopter according to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The damper system of the present application overcomes the above-listed problems commonly associated with conventional systems. Specifically, the damper system includes a heater associated with a damper, wherein the heater provides heat energy to the damper prior to or during flight. The system is further provided with one or more of a control system and sensors that monitor and regulate the heat energy. These features greatly reduce the time exhausted for pre-flight readiness and allow real-time monitoring and adjustment of the damper spring rate. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Figure 2:
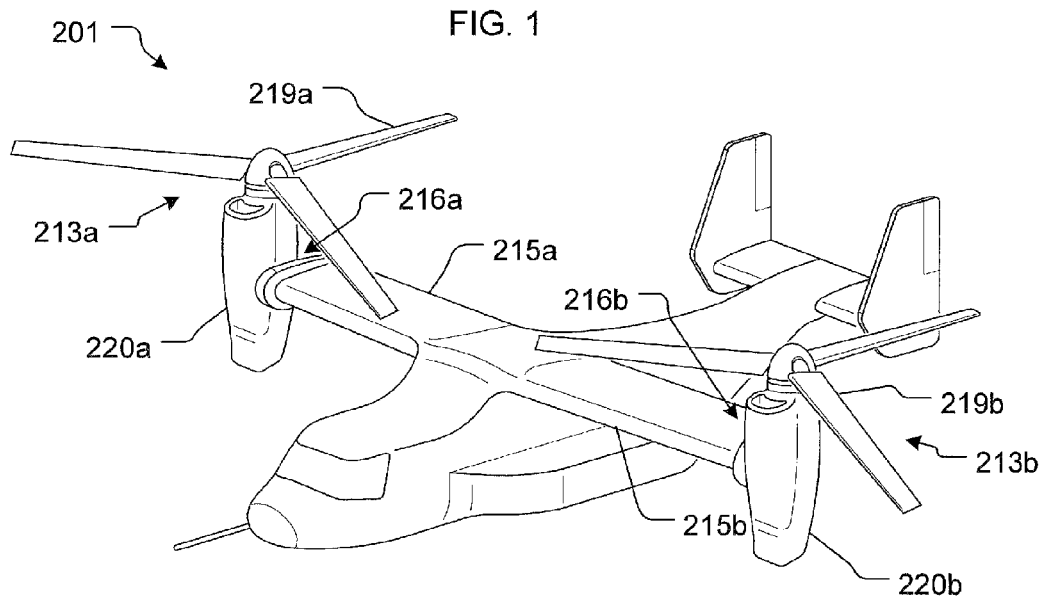
FIG. 2 is a perspective view of a tiltrotor aircraft according to an alternative embodiment of the present application.

Although shown associated with a helicopter, it will be appreciated that the damper system of the present application could also be utilized with different types of rotary aircraft and vehicles. For example, FIG. 2 illustrates a tiltrotor aircraft 201 that utilizes the damper system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Figure 3:
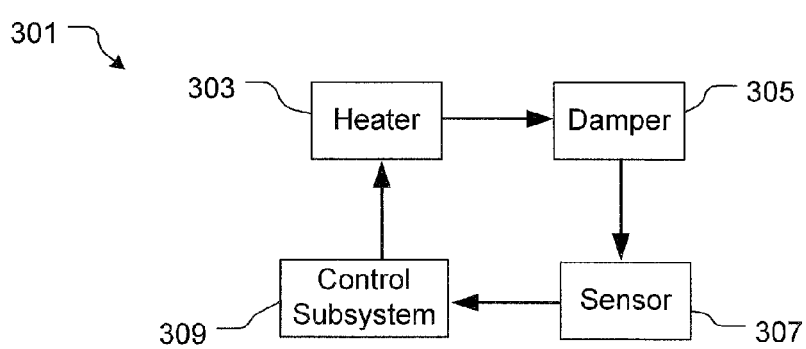
FIG. 3 is a simplified schematic of the damper system in accordance with a preferred embodiment of the present application.

FIG. 3 shows a simplified schematic of the damper system 301 according to the preferred embodiment of the present application. Damper system 301 includes a heater 303 configured to provide heat energy to the damper 305. One feature believed characteristic of damper system 301 is to provide means to sense and regulate the heat energy provided to damper 305. To achieve these features, damper system 301 is provided with one or more sensors 307 operably associated with a control subsystem 309. The control subsystem 309 monitors and regulates amount of heat energy provided to the damper to achieve a desired spring rate during flight and/or to prepare the damper for preflight. Further detailed description of these features is provided below and show in the corresponding figures.

Figure 4:
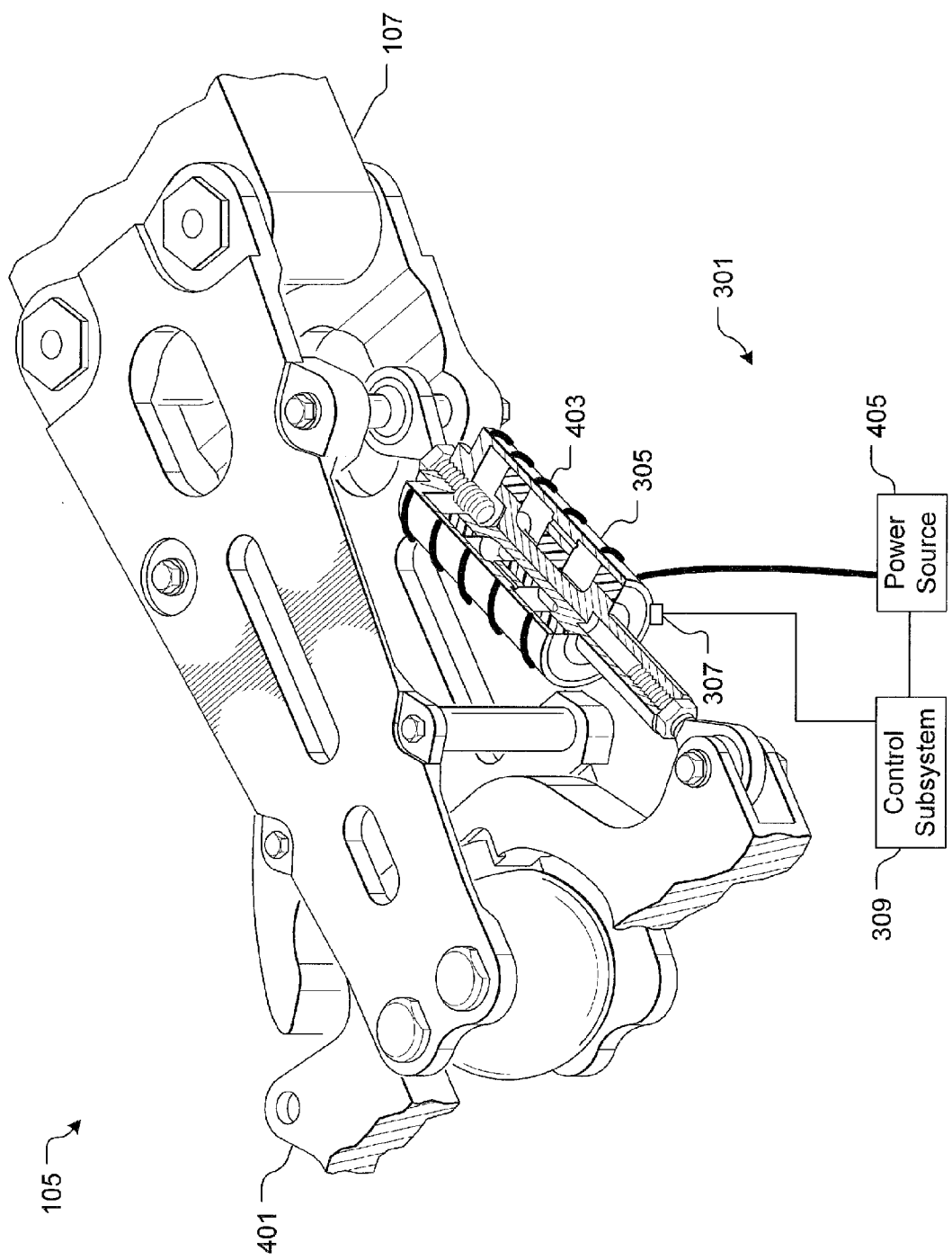
FIG. 4 is a perspective view of a rotor system in accordance a preferred embodiment of the present application.
Figure 5:
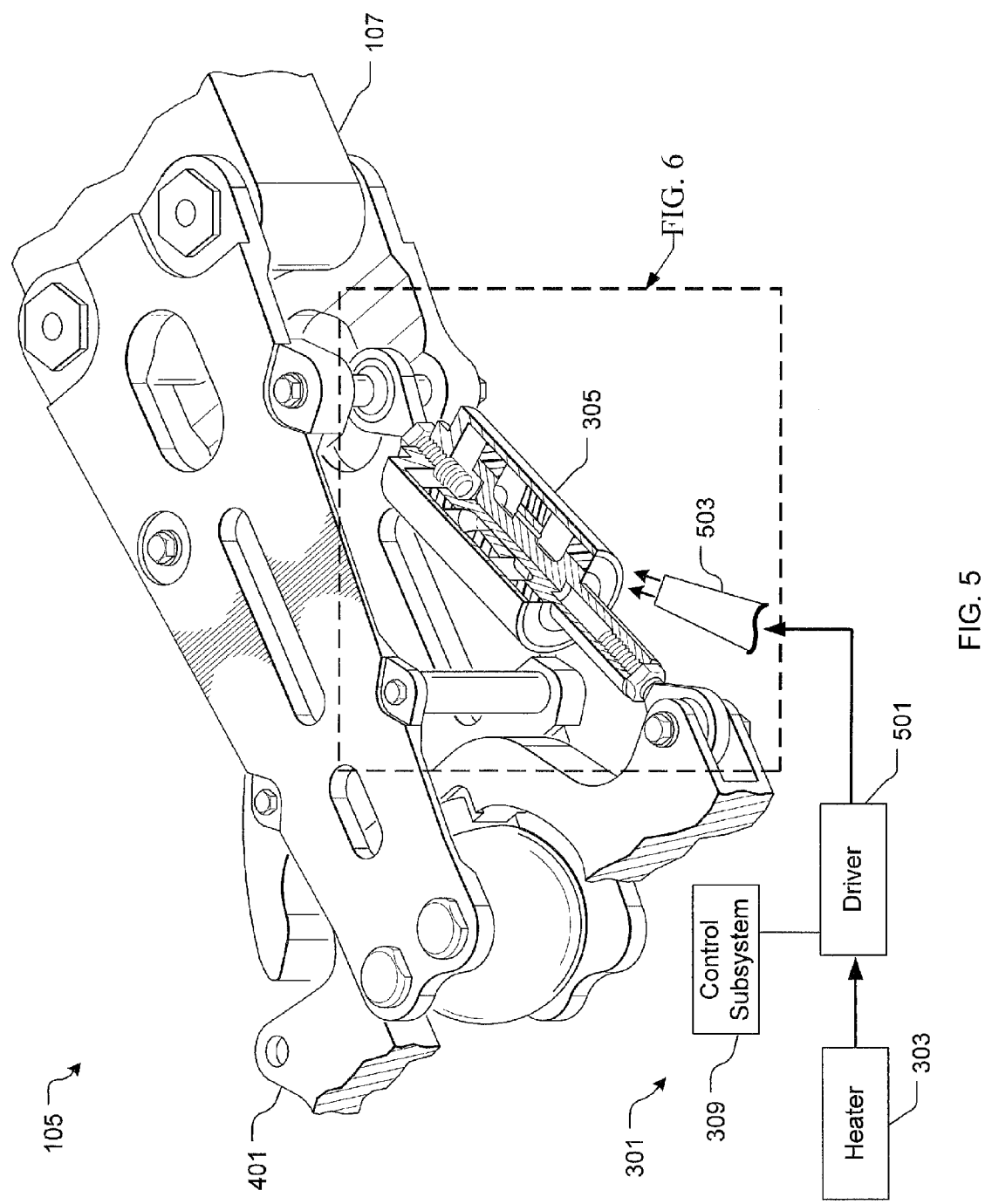
FIG. 5 is a perspective view of a rotor system in accordance with an alternative embodiment of the present application.
Figure 7:
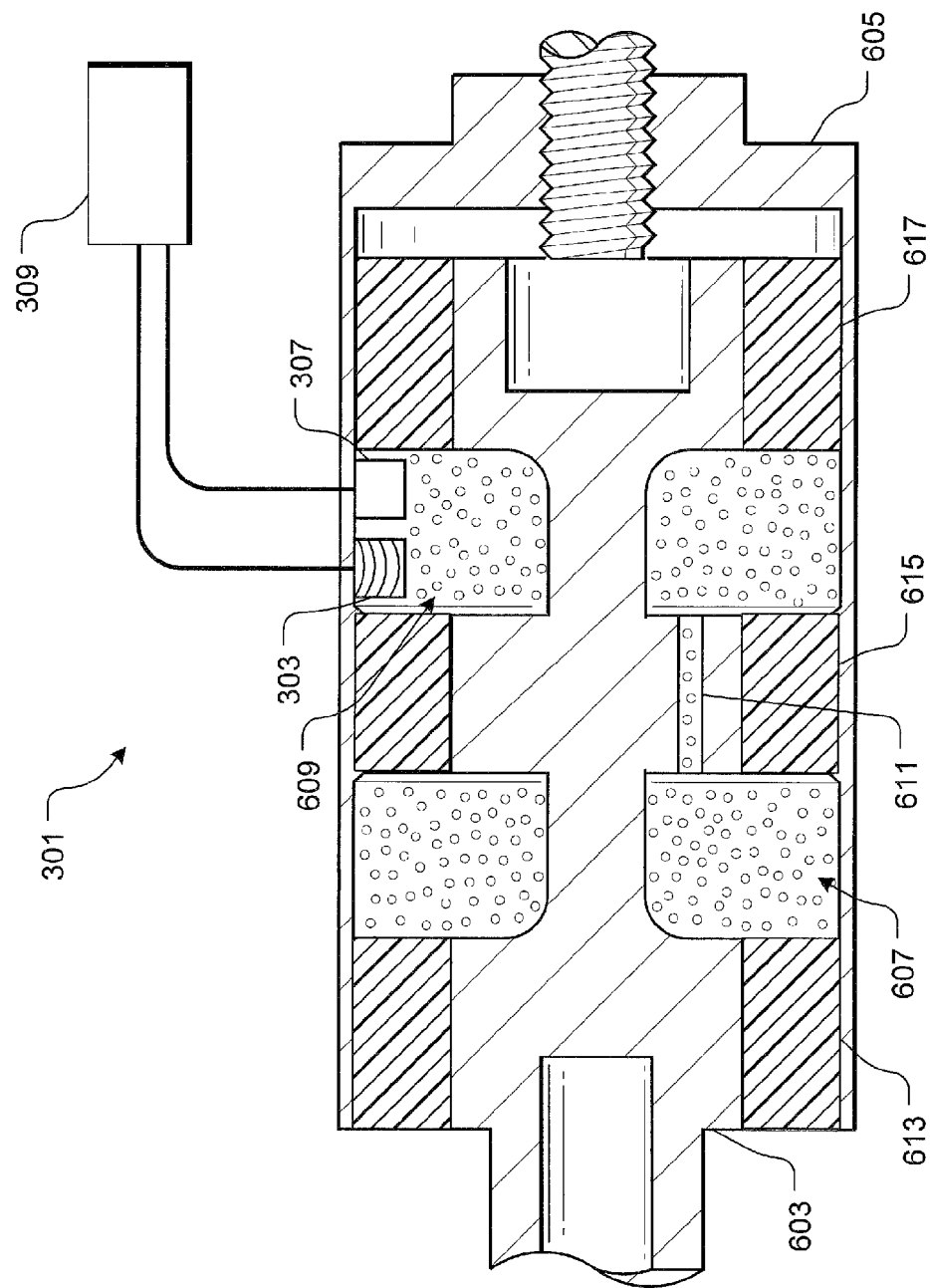
FIG. 7 is a cross-sectional side view of the damper of FIG. 6.

FIGS. 4, 5, and 7 depict various embodiments of damper system 301, wherein each embodiment utilizes different means for providing heat energy to the damper. Although shown in these three illustrative embodiments, alternative embodiments are also contemplated, all falling within the spirit of the present application.

FIG. 4 shows a perspective view of rotor system 105 having a yoke 401 rotatably attached to rotor blade 107. Damper 305 attaches to both yoke 401 and blade 107, and during operation, damper 305 is configured to dampen forces exerted on the yoke via the blade during flight.

In the exemplary embodiment, damper 305 is shown operably associated with the rotor system; however, it will be appreciated that the features discussed herein could also be utilized on one or more different systems and devices of the aircraft and should not be narrowly construed as limited to rotor systems.

FIG. 4 illustrates a first embodiment of damper system 301, wherein heat energy is provided to the damper via conductive means. More specifically, damper system is provided with one or more conductors 403 extend peripherally around the outer housing of damper 305. An electrical power source 405 is conductively coupled to the conductors 403. During use, the power source 405 provide electrical energy to the conductors 403, which in turn converts the electrical energy to heat energy, thereby transmitting heat energy to one or more of the components of the damper, i.e., the elastomeric material disposed within the damper.

Control subsystem 309 is shown operably associated with power source 405. During use, the control subsystem monitors and regulates the heat energy to damper 305, which in turn allows allow selective controlling of the damper spring rate during flight and/or preflight warming of the damper.

It will be appreciated that alternative embodiments could include a blanket or similar means to cover conductors 403 and/or to provide separation means between the conductors and the housing.

FIG. 5 illustrates an alternative embodiment of damper system 301, wherein the system heats damper 305 via convection means. Specifically, system 301 utilizes a heater 303, i.e., the aircraft engine, and a driver 501, i.e., a blower, to channel heat energy from the heat source to damper 305. In the contemplated embodiment, one or more conduits 503 could be utilized to transfer the heat energy.

Figure 6:
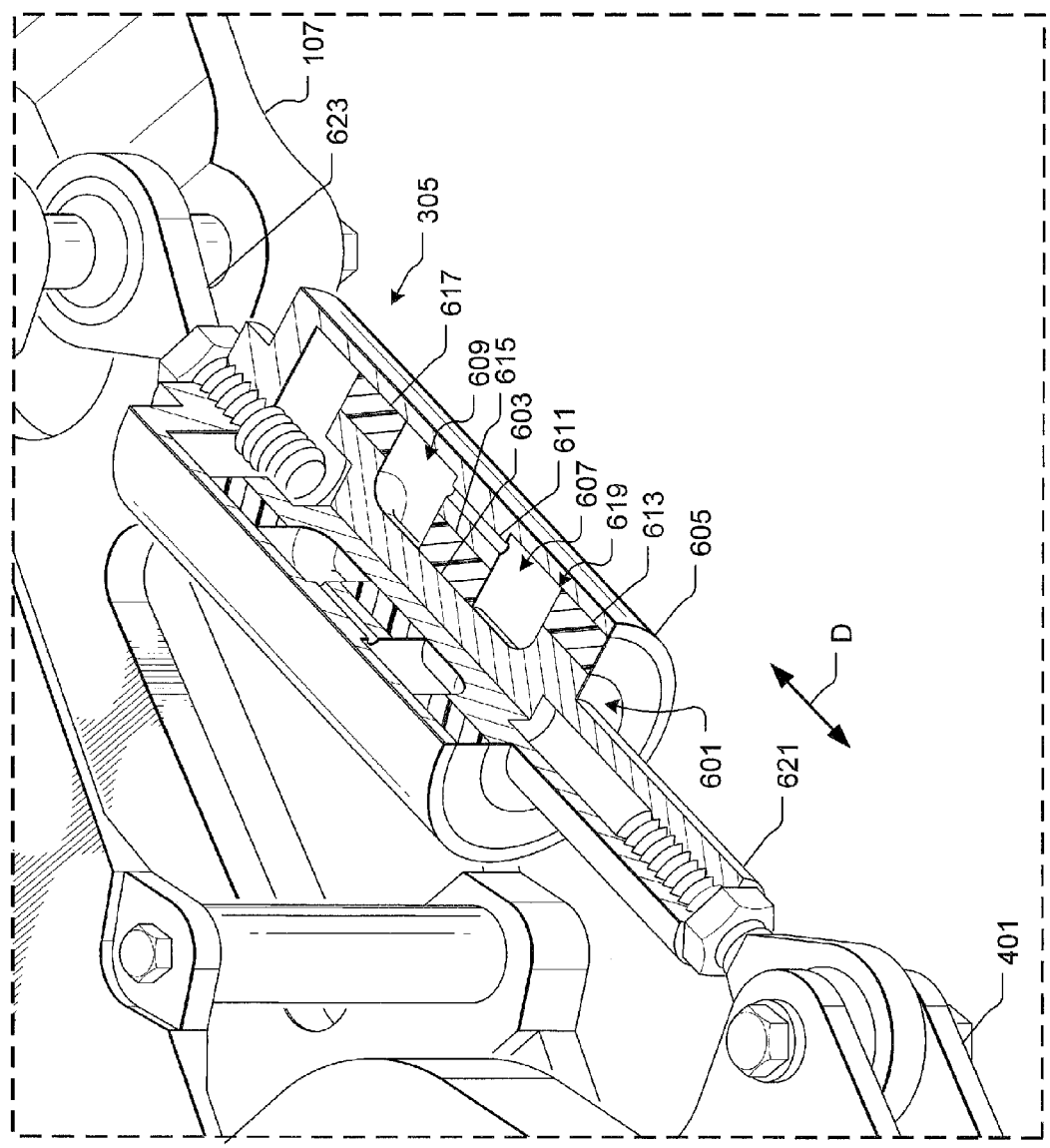
FIG. 6 is a perspective view of a damper of the damper system of FIG. 5.

FIG. 6 is a partial cross-sectional view of damper 305 taken from FIG. 5. Damper 305 includes a dampening device 601 configured to dampen forces exerted against damper 305, which in the preferred embodiment, is a piston 603 disposed within a housing 605 and situated between two fluid chambers 607 and 609. A fluid passage 611 extending through piston 603 and provides fluid communication between the two chambers. In the exemplary embodiment, three elastomeric seals 613, 615, and 617 are utilized to secure piston 603 to an inner surface 619 of housing 605. Damper 305 is shown pivotally attached to yoke 401 via a piston rod 621 and pivotally attached to rotor blade 107 via a fastener 623.

During operation, the elastomeric materials and fluid passing between the two chambers operate to dampen the forces exerted on the rotor yoke via the rotor blade, as depicted with arrow "D" in the drawings. In the illustrative embodiment, damper 305 is configured to reduce lead/lag forces of the rotor blade. Of course, it will be appreciated the features discussed herein could be incorporated on other types of dampers that dampen different forces in lieu of the preferred embodiment.

FIG. 7 depicts an alternative embodiment of damper system 301. In this embodiment, the heater 303 and the sensor 307 are positioned within the damper, for example, disposed within chamber 609 in direct communication with the fluid carried therein. In the contemplated embodiment, heater 303 is a plurality of electric coils configured to transfer electrical energy to heat energy.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A damper system, comprising:
   a damper having:
      a first fluid chamber and a second fluid channel fluidly connected to each other via a fluid passage;
      a housing; and
      a piston disposed within the housing;
      wherein the piston is configured to dampen a force exerted on the damper;
      wherein the piston forms the first fluid chamber and the second fluid chamber; and
      wherein fluid passages between the first fluid chamber and the second fluid chamber as the piston moves within the housing;
   a heater having a plurality of coils operably associated with the damper, the plurality of coils being positioned within the first chamber; and
   a control subsystem operably associated with the heater;
   wherein the heater is configured to provide heat energy to a fluid passing between the first fluid chamber and the second fluid chamber; and
   wherein the control subsystem is configured to regulate the amount of heat energy to the damper.

2. The damper system of claim 1, further comprising:
a sensor associated with the control subsystem;
wherein the sensor senses the heat energy to the damper; and
wherein the control subsystem monitors the heat energy via the sensor and regulates the amount of heat energy accordingly.

3. The damper system of claim 1,
wherein the fluid passage extends through the piston.

4. A rotor system, comprising:
a yoke;
a rotor blade attached to the yoke;
a damper configured to dampen forces exerted on the yoke via the rotor blade; the damper having:
 a first fluid chamber and a second fluid channel fluidly connected to each other via a fluid passage;
 a housing; and
 a piston disposed with the housing;
 wherein the piston is configured to dampen a force exerted on the damper;
 wherein the piston forms the first fluid chamber and the second fluid chamber; and
 wherein fluid passages between the first fluid chamber and the second fluid chamber as the piston moves with the housing;
a heater having a plurality of coils operably associated with the damper, the plurality of coils being positioned within the first chamber;
a control subsystem operably associated with the heater and configured to regulate the heat energy to the damper;
wherein the heater is configured to provide heat energy to a fluid passing between the first fluid chamber and the second fluid chamber.

5. The rotor system of claim 4, further comprising:
a sensor associated with the control subsystem;
wherein the sensor senses the heat energy to the damper; and
wherein the control subsystem monitors the heat energy via the sensor and regulates the amount of heat energy accordingly.

\* \* \* \* \*